(12) United States Patent
Hsu et al.

(10) Patent No.: US 8,050,024 B2
(45) Date of Patent: Nov. 1, 2011

(54) ELECTRONIC DEVICE

(75) Inventors: Yuan-An Hsu, Taipei (TW); San-Feng Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 20 days.

(21) Appl. No.: 12/501,491

(22) Filed: Jul. 13, 2009

(65) Prior Publication Data

US 2010/0053877 A1    Mar. 4, 2010

(30) Foreign Application Priority Data

Sep. 4, 2008  (TW) ................................ 97133962 A

(51) Int. Cl.
*H05K 7/16*    (2006.01)
(52) U.S. Cl. ................ 361/679.27; 361/679.02; 248/917
(58) Field of Classification Search ............. 361/679.27, 361/679.01, 679.02, 727; 455/575.1–575.4; 248/917–924
See application file for complete search history.

(56) References Cited

U.S. PATENT DOCUMENTS

| | | | |
|---|---|---|---|
| 5,276,589 A * | 1/1994 | Bartlett et al. ........... | 361/679.06 |
| 6,154,359 A * | 11/2000 | Kamikakai et al. ...... | 361/679.27 |
| 6,826,043 B2 * | 11/2004 | Chang ...................... | 361/679.27 |
| 7,614,591 B2 * | 11/2009 | Yen ............................ | 248/150 |
| 2002/0186528 A1 * | 12/2002 | Huang ........................ | 361/683 |

FOREIGN PATENT DOCUMENTS

| TW | 470290 | 12/2001 |
|---|---|---|
| TW | M299453 | 10/2006 |

OTHER PUBLICATIONS

"Office Action of Taiwan Counterpart Application", issued on Apr. 15, 2011, p. 1-p. 5, in which the listed reference was cited.

* cited by examiner

*Primary Examiner* — Jinhee Lee
*Assistant Examiner* — Ingrid Wright
(74) *Attorney, Agent, or Firm* — Jianq Chyun IP Office

(57) ABSTRACT

An electronic device is provided. The electronic device includes a first casing, a second casing, a plurality of connecting rods and a connecting part. The first casing has an upper surface, and an end of each of the connecting rods is connected to the second casing. The connecting part connected to the first casing has a first connecting portion and a second connecting portion having a lower surface and two corresponding side surfaces adjacent to the first connecting portion. The lower surface faces the upper surface of the first casing and is parallel with the upper surface. A runner is formed at each of the side surfaces, and the other ends of the connecting rods are slidingly disposed in the runners correspondingly to allow the second casing to move relative to the first casing via the runners of the connecting part and the connecting rods.

9 Claims, 6 Drawing Sheets

ELECTRONIC DEVICE

CROSS-REFERENCE TO RELATED APPLICATION

This application claims the priority benefit of Taiwan application serial no. 97133962, filed on Sep. 4, 2008. The entirety of the above-mentioned patent application is hereby incorporated by reference herein and made a part of specification.

BACKGROUND OF THE INVENTION

1. Field of the Invention

The invention relates to an electronic device and, more particularly, to an electronic device having preferable heat dissipating effect.

2. Description of the Related Art

Since a notebook computer has advantages such as small dimensions, being light in weight and easy to carry, it is widely used nowadays. However, more and more functions of the notebook computer are required by users, and thus the system configurations of the notebook computers are varied day by day.

Although the number of the systems configured in the notebook computer increases day by day, the size of the notebook computer is required to be smaller and smaller. To meet the two conflicting requirements, the systems in the notebook computer are crowded, and there is no enough space to dissipate heat generated by the systems effectively. Thus, the heat generated by the systems is easy to be accumulated and is not easy to be dissipated, and this may affect the operation effect of the notebook computer.

BRIEF SUMMARY OF THE INVENTION

The invention provides an electronic device having preferable heat dissipating effect.

The invention provides an electronic device including a first casing, a second casing, a plurality of connecting rods and a connecting part. The first casing has an upper surface, and an end of each of the connecting rods is connected to the second casing. The connecting part has a first connecting portion and a second connecting portion which are connected to each other. A surface of the first connecting portion contacts a side surface of the first casing, and the second connecting portion has a lower surface and two corresponding side surfaces adjacent to the first connecting portion. The lower surface faces the upper surface of the first casing and is parallel with the upper surface, and a runner is formed at each of the side surface. The other ends of the connecting rods are slidingly disposed in the runners correspondingly, and the second casing may move relative to the first casing via the runners of the connecting part and the connecting rods.

In an embodiment of the invention, an accommodating space is formed between the second connecting portion and the first casing to accommodate the second casing.

In an embodiment of the invention, the first connecting portion has a bottom surface relatively away from the second connecting portion, and the bottom surface is disposed at the upper surface of the first casing.

In an embodiment of the invention, the first casing has a plurality of side surfaces connected to the upper surface, and the first connecting portion is connected to the second connecting portion and substantially vertical to the second connecting portion. The first connecting portion has an inner surface connected to the lower surface of the second connecting portion, and the inner surface is connected to one of the side surfaces.

In an embodiment of the invention, an angle is formed between the connecting rods and the second casing, and the angle is less than 90 degree.

In an embodiment of the invention, the first casing has a keyboard located at the surface of the first casing facing the second casing.

In an embodiment of the invention, the material of the connecting part includes plastic or metal.

In an embodiment of the invention, a hollow space is in the second connecting portion.

In an embodiment of the invention, the hollow space is used to accommodate a optical disk drive or a loudspeaker.

In an embodiment of the invention, the electronic device further includes a display screen or a plurality of alarming lights, and the display screen or the alarming lights may be disposed at the surface of the second connecting portion relatively away from the first casing.

In the invention, the space for configuring the systems in the electronic device increases due to the connecting part, and thus the heat dissipating effect of the electronic device is improved, too.

These and other features, aspects and advantages of the present invention will become better understood with regard to the following description, appended claims, and accompanying drawings.

DETAILED DESCRIPTION OF THE EMBODIMENTS

Figure 1A:
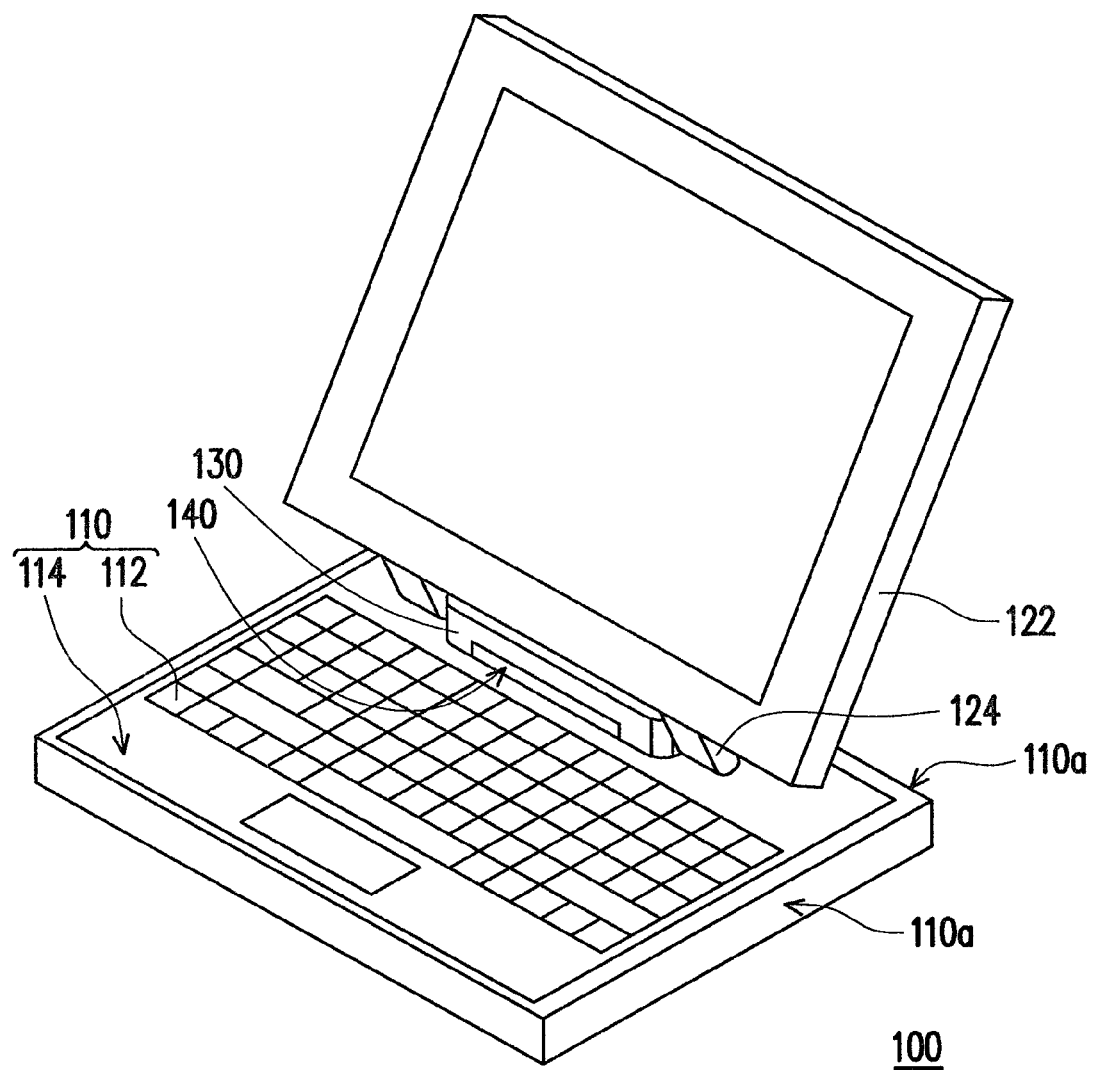
FIG. 1A and FIG. 1B are schematic diagrams showing an electronic device in an embodiment of the invention from different viewing angles.
Figure 1B:
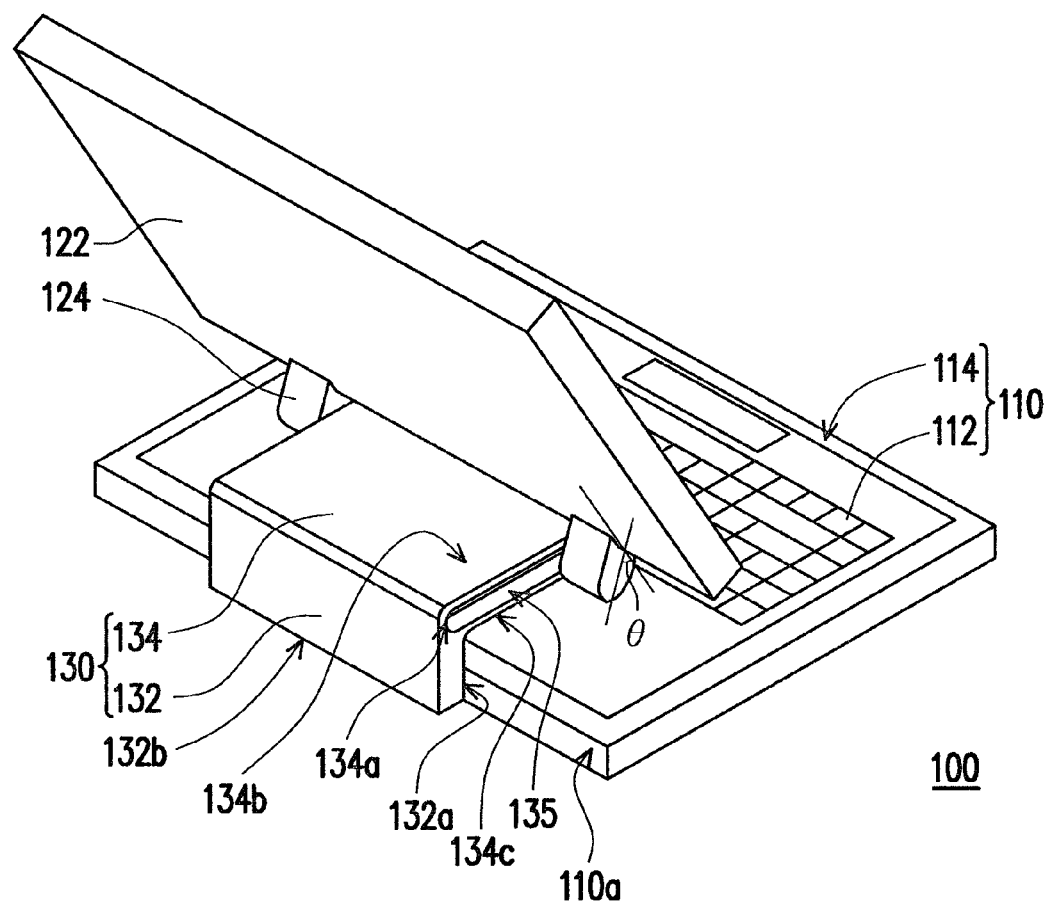
Figure 1C:
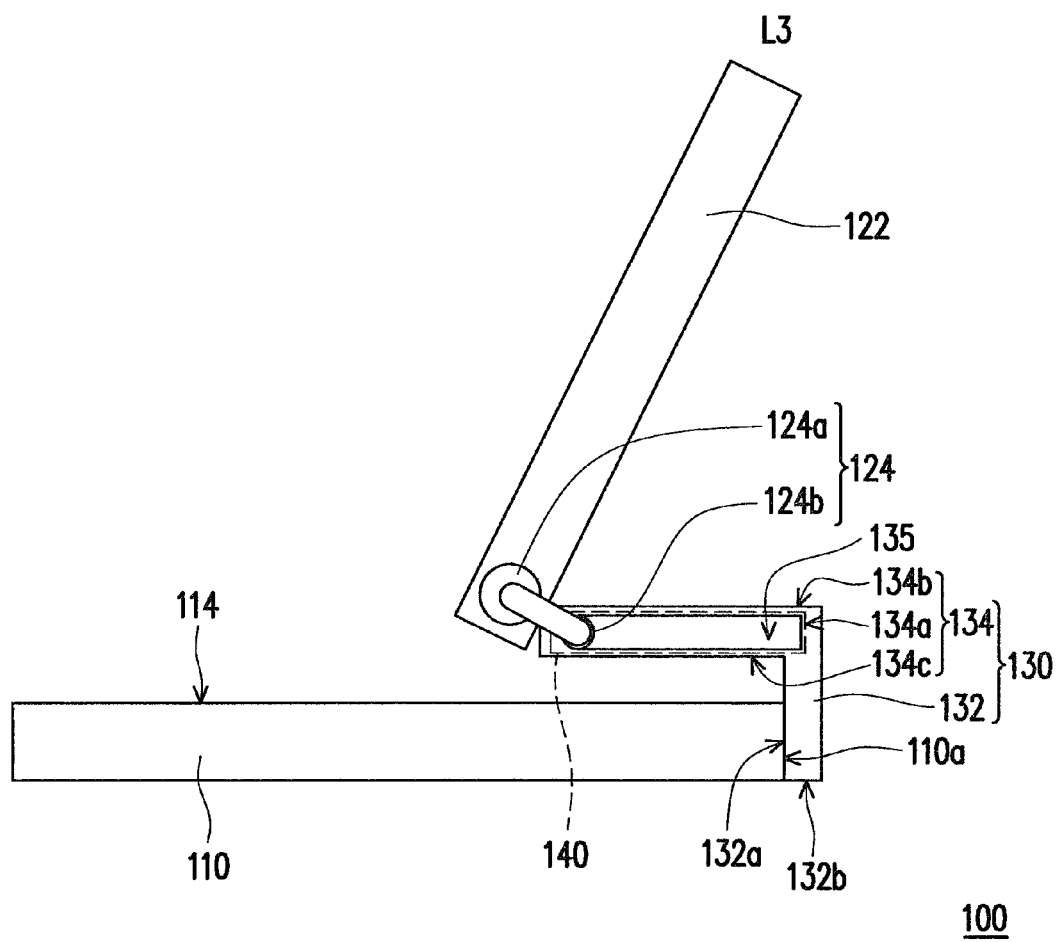
FIG. 1C is a side view showing the electronic device in FIG. 1A and FIG. 1B.

FIG. 1A and FIG. 1B are schematic diagrams showing an electronic device in an embodiment of the invention from different viewing angles. FIG. 1C is a side view showing the electronic device in FIG. 1A and FIG. 1B. As shown in FIG. 1A, FIG. 1B and FIG. 1C, the electronic device 100 in the embodiment may be a notebook computer, a mobile phone, a portable personal digital assistant or one of other foldable electronic devices. In FIG. 1A and FIG. 1B, the electronic device 100 is a notebook computer. The electronic device 100 includes a first casing 110, a second casing 122, a plurality of connecting rods 124 and a connecting part 130. The first casing 110 has a keyboard 112, and the keyboard 112 is located at the upper surface 114 of the first casing 110 facing the second casing 122. In addition, the first casing 110 further has a plurality of side surfaces 110a. An end 124a of each of the connecting rods 124 is connected to the second casing 122, and the second casing 122 has a display screen for displaying images. In the embodiment, an angle θ is between the connecting rods 124 and the second casing 122, and the angle θ is less than 90 degrees.

The connecting part 130 has a first connecting portion 132 and a second connecting portion 134. The first connecting portion 132 may be connected to the second connecting portion 134 and substantially vertical to the second connecting portion 134 (as shown in FIG. 1C). In other words, the connecting part 130 may be L-shaped. In the embodiment, the second connecting portion 134 has an upper surface 134b, a lower surface 134c and two corresponding side surfaces 134a connected between the upper surface 134b and the lower surface 134c. The lower surface 134c is parallel with the upper surface 114 of the first casing 110, and the side surfaces 134a are adjacent to the second connecting portion 132. A runner 135 is formed at each side surface 134a, and the other ends 124b of the connecting rods 124 are slidingly disposed in the runners 135 to allow the second casing 122 to move relative to the first casing 110 via the runners 135 of the connecting part 130 and the connecting rods 124. The move mode may be sliding or rotating.

Besides, the first connecting portion 132 has an inner surface 132a connected to the lower surface 134c of the second connecting portion 134, and the inner surface 132a contacts one side surface 110a of the first casing 110.

Although in the embodiment the inner surface 132a of the first connecting portion 132 is connected to the side surfaces 110a of the first casing 110, a skilled person in the art may change the mode of connecting the first connecting portion 132 and the first casing 110. For example, the first connecting portion 132 has a bottom surface 132b relatively away from the second connecting portion 134, and the bottom surface 132b is disposed on the upper surface 114 of the first casing 110.

A distance is between the lower surface 134c of the second connecting portion 134 and the upper surface 114 of the first casing 110 to form an accommodating space. The accommodating space is used to accommodate the second casing 122.

Figure 2A:
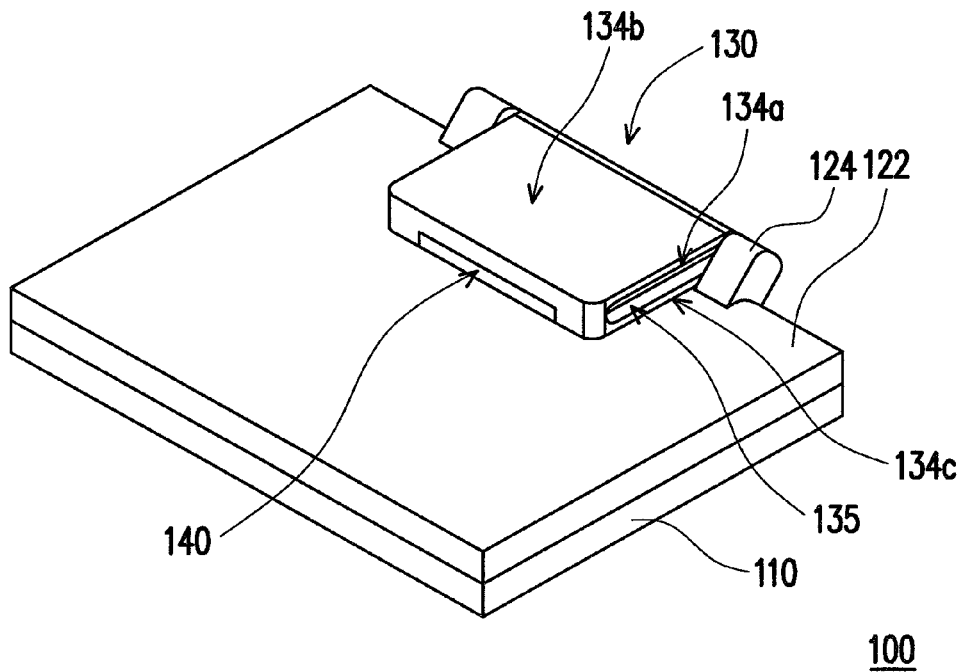
FIG. 2A and FIG. 2B are schematic diagrams showing the electronic device when it is folded.
Figure 2B:
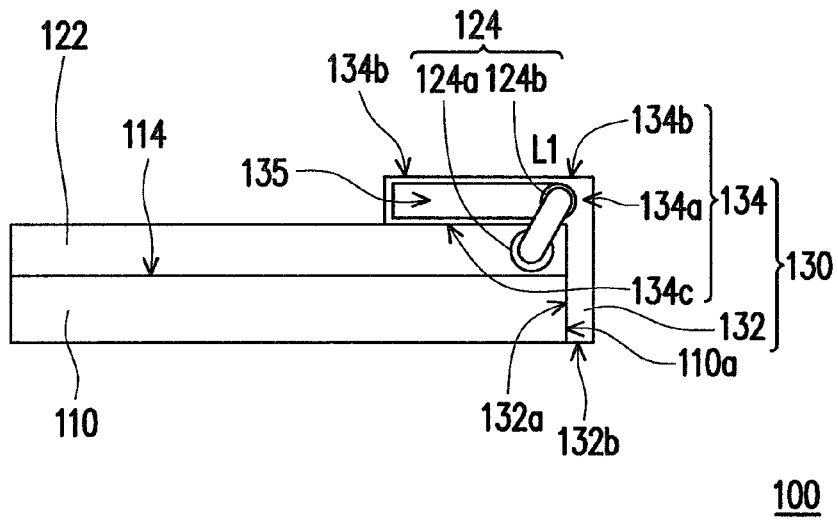

FIG. 2A and FIG. 2B are schematic diagrams showing the electronic device when it is folded. As shown in FIG. 2A and FIG. 2B, when the electronic device 100 is folded, the first casing 110 and the second casing 122 overlap. The second connecting portion 134 of the connecting part 130 is located on the second casing 122, and in other words, the second casing 122 is located in the accommodating space formed by the second connecting portion 134 and the first casing 110. At that moment, the connecting rods 124 are located at a first position L1.

Figure 3A:
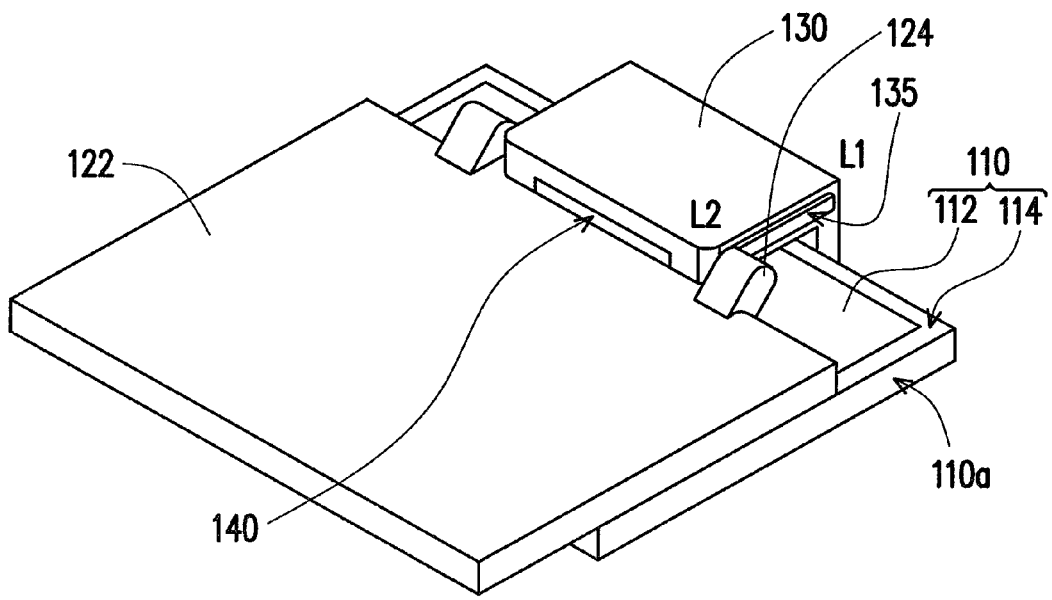
FIG. 3A and FIG. 3B are schematic diagrams showing that the second casing moves relative to the first casing via the connecting part.
Figure 3B:
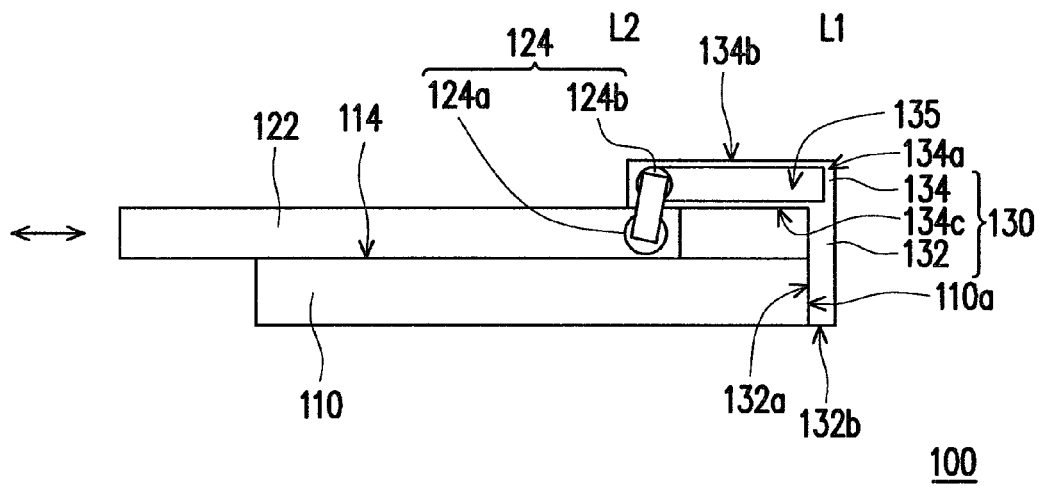

FIG. 3A and FIG. 3B are schematic diagrams showing that the second casing moves relative to the first casing via the connecting part. As shown in FIG. 3A and FIG. 3B, the user may move the second casing 122 by his or her hand to make the ends 124b of the connecting rods 124 slide in the runners 135 at the side surface 134a of the second connecting portion 134. Since the second connecting portion 134 is located above the second casing 122, the second connecting portion 134 may limit the position of the second casing 122. Before the ends 124b of the connecting rods 124 move to the second position L2, the second casing 122 only may move relative to the first casing 110 via the ends 124b of the connecting rods 124, and it cannot rotate relative to the first casing 110 about the ends 124b.

When the ends 124b of the connecting rods 124 slide from the first position L1 to the second position L2, the second casing 122 is not limited by the second connecting portion 134, and it may rotate relative to the first casing 110 about the ends 124b.

Figure 4:
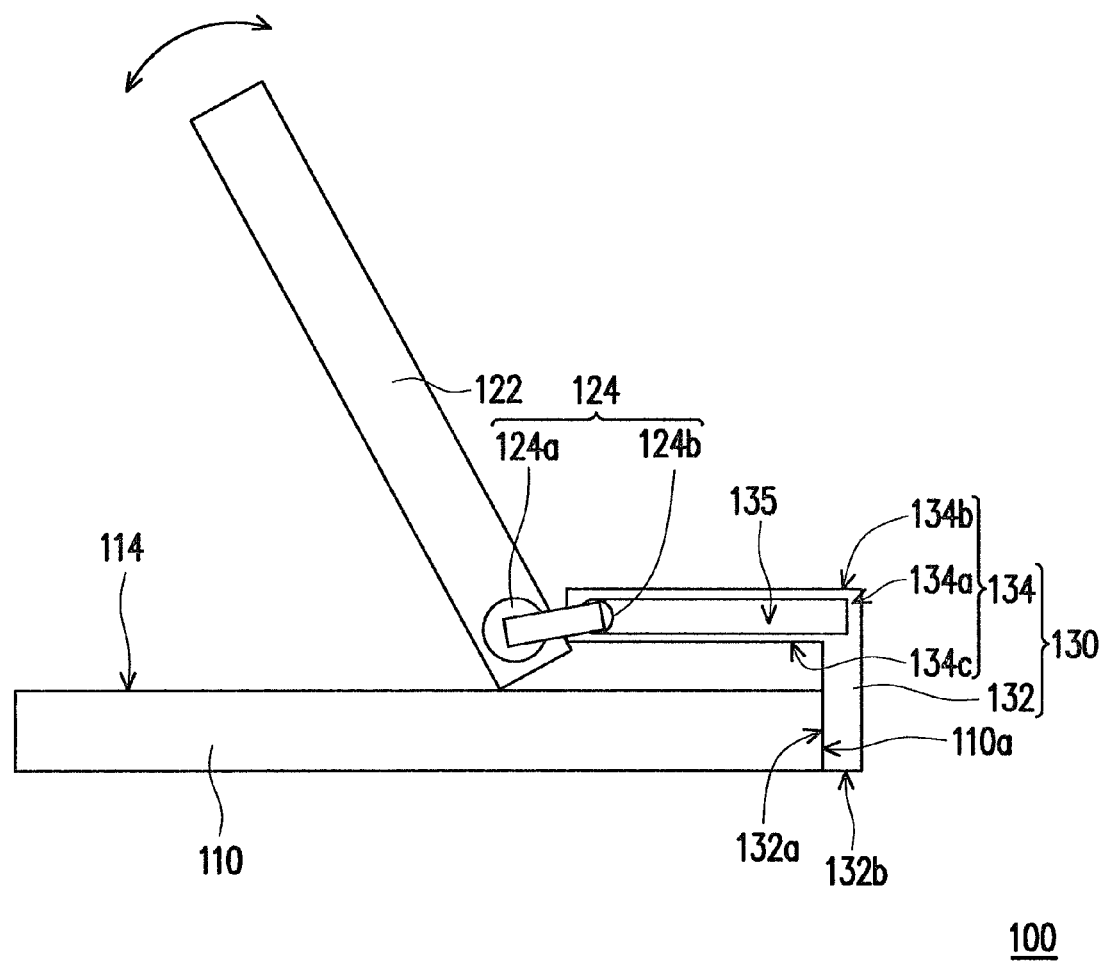
FIG. 4 is a schematic diagram showing the rotation of the second casing relative to the first casing.

FIG. 4 is a schematic diagram showing the rotation of the second casing relative to the first casing. As shown in FIG. 1A and FIG. 4, the user moves the second casing 122 with his or her hand to allow the second casing 122 to rotate relative to the first casing 110 via the ends 124b pivotally disposed in the runners 135 and make the second casing 122 relatively leave the first casing 110 away. When the user rotates the second casing 122 to the third position L3 (as shown in FIG. 1C), the user may input commands via the keyboard 112 and make the second casing 122 display information. Thus, the user may use the electronic device 100 normally.

In the embodiment, the ends 124a of the connecting rods 124 are fixedly connected to the second casing 122. In other embodiments, to make the user feel convenient to adjust the angle of the display screen of the electronic device 100 relative to the user, the ends 124a of the connecting rods 124 also may be pivotally disposed at the second casing 122.

As shown in FIG. 2A, the electronic device 100 in the embodiment further may have a hollow space (not shown) in the second connecting portion 134 of the connecting part 130. A plurality of components or systems such as a optical disk drive 140 and so on may be disposed in the hollow space. In the conventional electronic device, the optical disk drive, the loudspeaker and other systems are disposed in the first casing 110 in the embodiment. This makes the space for configuring the systems in the first casing 110 limited. If a plurality of systems are configured, the systems are crowded, and the heat dissipating effect of the electronic device may be affected. If the heat dissipating effect of the electronic device is required, some systems should be abandoned. This makes the conventional electronic device limited in functions.

Via the connecting part 130, the optical disk drive 140 may be removed from the first casing 110, and it may be disposed in the connecting part 130. This may save the space for configuring the systems in the first casing 110 of the electronic device 100. Thus, the heat dissipating effect of the electronic device 100 is improved. In addition, since the space for configuring the systems in the electronic device 100 increases, the number of the systems which may be configured in the space also increases, and the functions of the electronic device increase therewith.

Although in the embodiment, the optical disk drive 140 is disposed in the second connecting portion 134, in other embodiments, the loudspeaker or other systems also may be disposed in the second connecting portion 134 of the connecting part 130. The optical disk drive 140, the loudspeaker or other systems also may be set in the first connecting portion 132, and this depends on the requirements.

In addition, an additional display screen or alarming lights also may be disposed on the upper surface 134b of the second connecting portion 134 of the connecting part 130. The upper surface 134b is relatively away from the upper surface 114 of the first casing 110, and the display screen or the alarming lights may have a display function and an alarming function.

When the user finishes using the electronic device 100 or does not need the electronic device 100 for a short while, the steps of folding the electronic device 100 are in a reverse order.

As shown in FIG. 1C and FIG. 4, the user rotates the second casing 122 first to make the second casing 122 rotate from the third position L3 to the second position L2 about the ends 124b of the connecting rods 124 to relatively get close to the first casing 110. Then, as shown in FIG. 3B and FIG. 2B, the second casing 122 is moved to make the ends 124b of the connecting rods 124 move to the first position L1 from the second position L2 along the runners 135. When the second casing 122 moves to the first position L1 from the second position L2 along with the ends 124b of the connecting rods 124, the electronic device 100 is folded completely.

To sum up, in the electronic device of the invention, the connecting part may increase the space for configuring the systems in the electronic device. Thus, the interval between each two systems is larger, and the electronic device may have preferable heat dissipating effect. In addition, the space for configuring the systems in the electronic device increases, and more systems may be configured in the electronic device. This increases the functions of the electronic device.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device comprising:
a first casing having an upper surface;
a second casing;
a plurality of connecting rods, wherein an end of each of the connecting rods is connected to the second casing; and
a connecting part having a first connecting portion and a second connecting portion which are connected to each other and an accommodating space between the second connecting portion and the first casing to accommodate the second casing, wherein the first connecting portion is connected to the first casing, the second connecting portion has a lower surface and two corresponding side surfaces, a runner is formed at each of the side surfaces, the other ends of the connecting rods are slidingly disposed in the runners correspondingly, and the second casing moves relative to the first casing via the runners of the side surfaces of the second connecting portion of the connecting part and the connecting rods.

2. The electronic device according to claim 1, wherein the first connecting portion has a bottom surface relatively away from the second connecting portion, and the bottom surface is disposed at the upper surface of the first casing.

3. The electronic device according to claim 1, wherein the first casing has a plurality of side surfaces connected to the upper surface, the first connecting portion is connected to the second connecting portion and substantially vertical to the second connecting portion, the first connecting portion has an inner surface connected to the lower surface of the second connecting portion, and the inner surface is connected to one of the side surfaces.

4. The electronic device according to claim 1, wherein an angle is formed between the connecting rod and the second casing, and the angle is less than 90 degrees.

5. The electronic device according to claim 1, wherein the first casing has a keyboard located on the upper surface of the first casing.

6. The electronic device according to claim 1, wherein the connecting part comprises a plastic or metal material.

7. The electronic device according to claim 1, wherein a hollow space is in the second connecting portion.

8. The electronic device according to claim 7, wherein the hollow space is used to accommodate a optical disk drive or a loudspeaker.

9. The electronic device according to claim 1, further comprising a display screen or a plurality of alarming lights disposed at a surface of the second connecting portion relatively away from the first casing.

* * * * *